(No Model.) 2 Sheets—Sheet 2.

G. W. LIGHT.
HAY RACK.

No. 375,824. Patented Jan. 3, 1888.

Witnesses
C. L. Taylor
R. W. Bishop

Inventor
Geo. W. Light
By his Attorneys
C. A. Snow & Co.

N. PETERS, Photo-Lithographer, Washington, D. C.

UNITED STATES PATENT OFFICE.

GEORGE W. LIGHT, OF GALLATIN, MISSOURI.

HAY-RACK.

SPECIFICATION forming part of Letters Patent No. 375,924, dated January 3, 1888.

Application filed November 11, 1886. Serial No. 218,638. (No model.)

*To all whom it may concern:*

Be it known that I, GEORGE W. LIGHT, a citizen of the United States, residing near Gallatin, in the county of Daviess and State of Missouri, have invented a new and useful Hay-Rack for Feeding Cattle, Horses, and Mules, of which the following is a detailed description and specification.

The invention relates to improvements in hay-racks for cattle, the object being to construct a rack in which but one animal can feed at a side, in which the fodder or hay will feed down equally on every side from whichever point it may be inserted, and in which refuse—such as hay-seed and dirt—will fall clear of the fodder or hay, when stirred by the feeding animals, and into a receptacle out of their reach; and it consists in the construction and novel combination of parts hereinafter described, and pointed out in the claim hereto appended.

Figure 1:
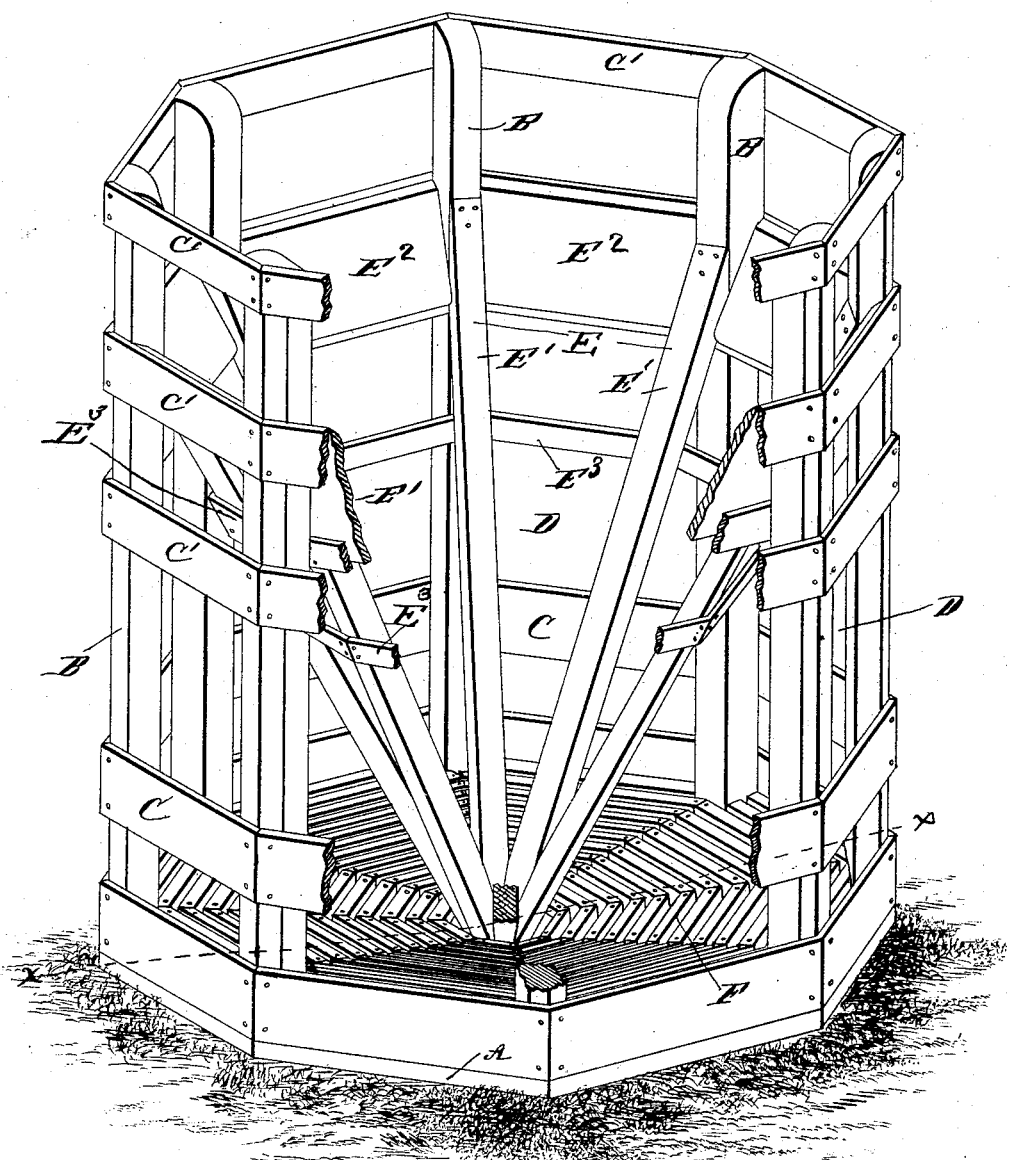
Figure 2:
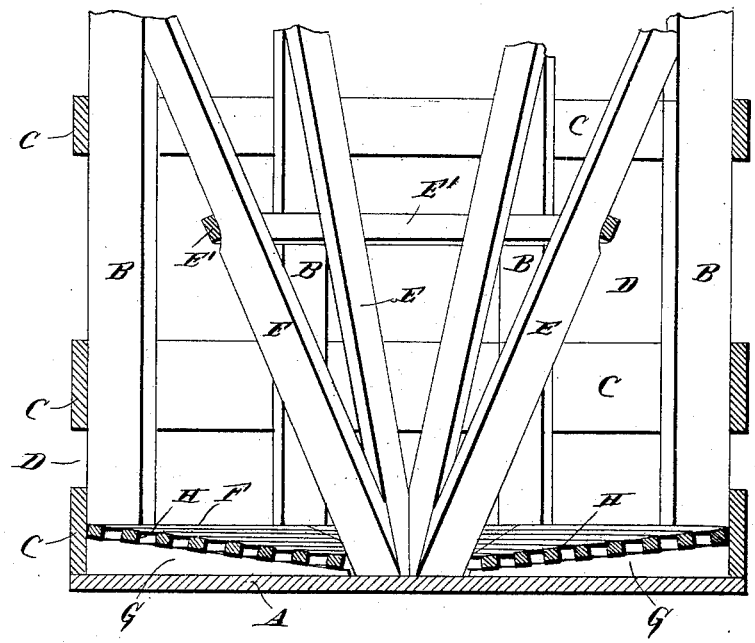
Figure 3:
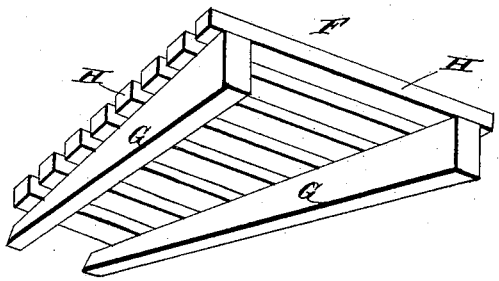

In the drawings, Figure 1 represents a perspective view of a rack embodying the invention, with a part of the frame broken away to show the interior structure. Fig. 2 represents a partial cross section of the same on the line $x\ x$ of Fig. 1. Fig. 3 represents a perspective view of one of the grating-sections of the rack-frame.

Referred to the drawings by letter, A designates a case or box forming the base of the rack-frame, which box has a floor of angular contour, the side edges being of equal length and the sides rising from the floor. From the floor, in the angles formed by the said sides, rise the similar uprights B of the rack-frame, their lower ends being bolted or nailed to the adjoining ends of the sides, as shown in Fig. 1.

C C are aligned strips nailed around the uprights parallel and close enough to the sides of the box to prevent such animals as hogs, sheep, &c., having access to the interior of the frame.

C' C' are several series of strips secured around the upright so as to hold their upper parts securely together and stiffen the frame. The said series are parallel to each other, and the lower series is far enough above the protecting-strips C to permit cattle to introduce their heads through the open spaces D between and reach the rack E within the frame. The said rack is constructed as follows:

E' E' are the rack-bars, each having its upper end secured to the inner edge of an upright, B, near the top thereof, and running thence to the center of the floor of the box A, where the lower ends of all the rack-bars are firmly secured together. As the rack-bars are each secured to one of the uprights B and converge to the center of the frame, the spaces between the rack-bars face the sides of the frame, so that access for cattle to the rack is rendered easy.

E² E² are chute-boards secured between adjacent uprights B and rack-bars E', with their upper edges flush with the upper edges of the series of strips C', adjacent to the top series of said strips. The said chute-boards are inclined in the same direction as the rack-bars, their inclination being about equal to that of said bars.

E³ E³ are brace-strips surrounding the rack-bars and binding them together.

F F are sections of grating, generally triangular in contour and corresponding in number to the sides of the box A. The said sections rest upon their side bars, G, on the floor of the box A, so that their transverse bars H are supported above said floor. The bars G are narrower at their inner ends, so that the grating inclines downward from the sides of the frame to the apex of the rack at the center of the box A, and the sections fit closely edge to edge and cover the whole floor of the box.

As the rack comes to a point below, it is evident that at whichever side the feed may be inserted over the corresponding chute-board E² connected to said side it will be equally accessible from all sides, as it must descend to the central apex, which is equally distant from all sides. Thus the feed needs no distribution by a pitchfork, and it is immaterial from which side it is introduced. As the spaces between the rack-bars face the sides, the feed is perfectly accessible to an animal introducing its head into the space D; and as but one animal can feed at a side, and their bodies, while feeding, diverge from the rack-frame, they are apt to feed in peace without interfering with each other. As the rack-bars incline to a point inward, the hay-seed, dirt, and other refuse in the upper portion of the food will drop out from the rack free of the food when it is stirred by the cattle feeding and will not descend in the rack, and after falling from the rack the refuse will pass through the grating into the box A and be out of reach of the cattle. The grating, by inclining downward as it runs inward, keeps any of the feed that may fall from the rack close to the foot of the same.

The rack-frame, rack, and box A may have any desired number of equal sides; but eight sides are preferable, as without making the affair too large the sides are reduced to a size convenient for one animal to feed at, but not large enough to accommodate two animals.

When it is necessary to clean out the box A, the sections of grating are removed.

Having described my invention, I claim—

The combination, with the rack-frame composed of the angular base-box A, the uprights B, rising from the floor of said box in the angles made by the sides thereof, the protective strips C C, and the series of binding-strips C' C', the lower series of which strips has the feeding-spaces D between it and the series of protective strips, of the rack consisting of the rack-bars E', having their upper ends secured to the inner edges of the uprights B, so that the spaces between said bars face the sides of the rack-frame and converge to an apex in the center of the floor of the box A, the feed-chutes $E^2$, the stay or brace strips $E^3$, and the sections of grating resting on the floor of the box A outside the rack and inclining downward and inward from the sides of the rack-frame to the apex of the rack, substantially as specified.

GEO. W. LIGHT.

Witnesses:
GEORGE TUGGLE,
FRANK E. DUIGAN.